(12) United States Patent
Merdzo

(10) Patent No.: US 7,942,431 B2
(45) Date of Patent: May 17, 2011

(54) WHEELED CHASSIS ASSEMBLY FOR VATS, ESPECIALLY FOR SORPTION COLUMNS

(75) Inventor: Edmund Merdzo, Munich (DE)

(73) Assignee: CS Clean Systems AG, Ismaning (DE)

( * ) Notice: Subject to any disclaimer, the term of this patent is extended or adjusted under 35 U.S.C. 154(b) by 376 days.

(21) Appl. No.: 12/288,064

(22) Filed: Oct. 16, 2008

(65) Prior Publication Data

US 2009/0102151 A1    Apr. 23, 2009

(30) Foreign Application Priority Data

Oct. 17, 2007    (DE) .......................... 10 2007 049 613

(51) Int. Cl.
    *B62B 1/00*    (2006.01)
(52) U.S. Cl. ...................................... 280/79.5; 280/79.2
(58) Field of Classification Search ............... 280/47.32, 280/47.31, 35, 47.3, 79.5, 79.2, 79.3; 16/30, 16/18 R
    See application file for complete search history.

(56) References Cited

U.S. PATENT DOCUMENTS

| | | | | |
|---|---|---|---|---|
| 2,049,344 A | * | 7/1936 | Wittke, Jr. ........................ | 16/30 |
| 2,543,697 A | | 2/1951 | Lanter | |
| 2,567,185 A | * | 9/1951 | Dominick ........................ | 16/30 |
| 2,573,085 A | * | 10/1951 | Yonkers ....................... | 280/79.5 |
| 2,772,889 A | * | 12/1956 | Reynolds ....................... | 280/35 |
| 3,463,505 A | | 8/1969 | German et al. | |
| 3,554,573 A | * | 1/1971 | Miller ........................... | 280/79.2 |
| 3,734,527 A | * | 5/1973 | Bard ............................. | 280/79.5 |
| 4,086,680 A | * | 5/1978 | Kelly ............................. | 16/30 |
| 4,827,564 A | * | 5/1989 | Brown ......................... | 16/18 R |
| 5,123,667 A | * | 6/1992 | Stolzman .................... | 280/79.5 |
| RE37,350 E | * | 9/2001 | Stephan ...................... | 280/79.5 |

FOREIGN PATENT DOCUMENTS

| | | |
|---|---|---|
| DE | 41 02 969 C1 | 10/1992 |
| DE | 195 32 279 C2 | 7/1998 |
| DE | 20 2006 07 612 U1 | 3/2006 |

\* cited by examiner

*Primary Examiner* — Hau V Phan
(74) *Attorney, Agent, or Firm* — Karl F. Milde, Jr.; Eckert Seamans Cherin & Mellot, LLC

(57) ABSTRACT

A wheeled chassis assembly for a sorption column in the form of a vat (1) for cleaning waste gases has at the bottom end thereof a depending foot rim (5) and an outwardly projecting corrugation (4). Wheel mounts (14) with wheels (7) thereon are pivotally secured to wheel brackets (6). Each wheel bracket (6) has an engagement surface (16) pressed onto the outside surface of vat (1) between foot rim (5) and corrugation (4) by a counter-piece (17) engaging the inside surface of foot rim (5) and threadingly coupled to wheel bracket (6). Engagement surfaces (16 and 18) are curved to conform with the outside surface of vat (1) and the inside surface of foot rim (5), respectively. Below an engagement surface (16), a wheel bracket (6) has an annular groove (19) for receiving a foot rim (5), its upper area having an inclined curved portion (21) for engaging the corrugation (4) and shaped to conform with the configuration thereof.

7 Claims, 3 Drawing Sheets

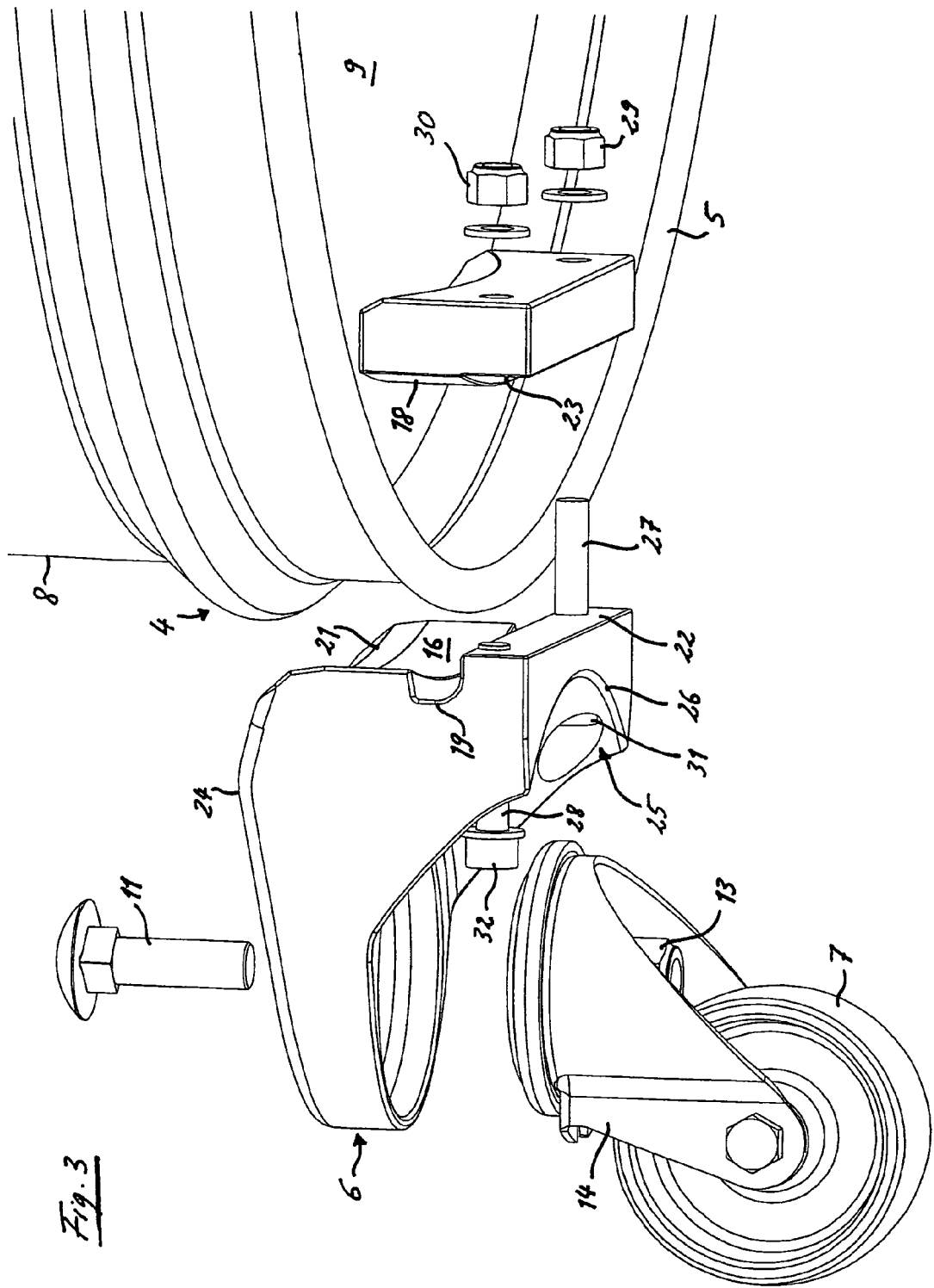

WHEELED CHASSIS ASSEMBLY FOR VATS, ESPECIALLY FOR SORPTION COLUMNS

BACKGROUND OF THE INVENTION

The invention relates to a wheeled carriage or chassis assembly for vats, especially for sorption columns used in waste-gas cleaning.

Sorption columns for waste-gas cleaning comprise a vat holding a stationary body of a solid sorbent material through which the waste gas to be cleaned is conducted for the removal of toxic substances (see DE 4 102 969 C1 and DE 195 32 279 C2). An important use is the cleaning of waste gases accruing in the semiconductor industry.

Sorption columns may have a considerable weight of several hundreds of kilograms so that they are designed to be movable on wheels. To this end, it is common practice to place the sorption column on a chassis having four wheel brackets welded thereto. Apart from the high cost of a chassis of this nature, its drawbacks are its increased height as well as its increased empty weight. In the semiconductor industry, for example, a sorption column is used in clean rooms or in grey rooms downstream of clean rooms—as in a cabinet, which a chassis requires to be built higher. As a result, the costly volume of these spaces is not utilized in an optimum manner.

SUMMARY OF THE INVENTION

The principal object of the present invention is to provide a wheeled chassis assembly for sorption columns in vat or drum form which is simple in design and compact in construction.

This object, as well as other objects which will become apparent to those skilled in the art, are achieved, in accordance with the present invention, by a structure wherein the wheel bracket attached to the periphery of the vat on the outer surface thereof is clamped to the counter-piece of which the mating surface engages the inside surface of the depending bottom or foot rim of the vat. As a result, the wheel bracket is secured in the area of the depending foot rim of the vat. For example, three, four or more wheel brackets may be secured to the vat and distributed along the periphery thereof. This way, the height of the vat will not increase significantly so that the inventive wheeled chassis assembly permits the volume in a clean room or a grey room to be utilized in an optimum manner.

The wheel bracket and its mating counter-piece are preferably formed to be castings, preferably of a lightweight metal and especially of an aluminum alloy. As a result, the manufacturing costs of the inventive chassis assembly—including its consumption of material—are relatively low. Further, its weight is reduced considerably.

In order to ensure a full-surface engagement as complete as possible of the engagement surface of the wheel bracket on the outside surface of the vat, as well as of the engagement surface of the mating counter-piece on the inside surface of the depending foot rim, the engagement surfaces of the wheel bracket and of the counter-piece are curved to conform with the outside surface of the vat and with the inside surface of the depending foot rim, respectively.

As castings made of an aluminum alloy are more deformable plastically than is the stainless steel body of the vat, the vat radius may vary slightly—within manufacturing tolerances, for example—without affecting the aforesaid full-surface contact and, thus, the operation of the wheeled chassis assembly. A vat having a markedly different radius requires new castings for the wheel brackets and their counter-pieces, however; all that is needed in this regard is the placement of inserts inside the mould. What this amounts to is that the mould is easily adapted to a variety of vat radii so that the costs of modified castings are low.

The depending foot rim borders the bottom edge of the vat's outer walls to which the vat's bottom panel is connected. The foot rim, the outer walls and the bottom panel consisting of stainless steel, they are welded to each other—especially by rolled-seam welding—to seal the sorption column to be gas-tight. At the same time, the depending foot rim protects the bottom edge of the vat when the vat is placed on a floor. Also, the rim stiffens the vat. Normally, the vat is a so-called drum, i.e. it is substantially cylindrical.

The outward corrugation in the bottom vat region, which supports the inclined section of the top portion of the wheel bracket's engagement surface, is indispensable for stiffening the vat and for load transmission through the wheel bracket. Preferably, the corrugation is approximately V-shaped in cross-section, with its two walls or legs preferably including an angle of about 90°.

The load the vat exerts is transferred to the wheel bracket, as is a tilting torque resulting from the lever arm acting between the wheel bracket engagement surface and the point of wheel contact on the floor. This lever arm and, thus, the tilting torque are highest when the wheel is pivoted to its outermost position, i.e. away from the vat.

Above all, the vat load is received by the wheel bracket in the area of the annular groove supporting the foot rim of the vat, and also by the inclined portion in the top area of the wheel bracket's engagement surface which supportingly engages the lower surface of the annular corrugation. Preferably, both walls of the corrugation and, thus, the inclined portion include an angle of about 45° with the longitudinal vat axis.

At the same time, this inclined section at the wheel bracket serves to receive the aforesaid tilting torque, and this together with the engagement surfaces of the wheel bracket and of the counter-piece at the outside of the vat and at the inside of the foot rim, respectively.

Preferably, the wheel brackets each have below the annular groove—and the counter-pieces below their engagement surfaces on the inside surface of the foot rim—a planar mating surface, said mating surfaces facing each other in a plane-parallel relationship. The plane-parallel mating surfaces permit a compensation of tolerances e.g. by means of shims placed between the aforesaid mating surfaces. Preferably the mating surfaces are undersized less than one millimeter—preferably 0.5 mm—relative to the engagement surfaces of the wheel brackets on the outside of the vat and of the counter-piece on the inside of the foot rim, respectively.

Preferably the top surface of the wheel bracket is upwardly curved between the vertical pivoting axis of the wheel support and the inclined section engaging the corrugation. The upward curvature reinforces the wheel bracket in this area, where—from finite-element analysis—much higher forces would act on the wheel bracket if its shape were not optimized (by the aforesaid upward curvature).

The wheel bracket preferably has in its bottom surface a spherically shaped recess which permits the wheel to be pivoted 360° and thus full circle through under the wheel bracket. As a result, the thickness of the wheel bracket is smaller at the centre of the horizontal circular arc the spherical recess describes than at the two ends of said circular arc. For threadingly coupling the counter-piece to the wheel bracket, a pair of threaded bolts are provided to engage said end areas, i.e. the two circumferential end areas of the counter-piece and the wheel bracket, respectively. To this end, the threaded bolts could extend through the wheel bracket and the counter-piece. In that case, each threaded bolt may have a polygonally socketed head extending through the through-bore in the wheel bracket, for example, and having a nut threaded on the opposite end of the threaded bolt extending through the counter-piece.

Clamped in place between the wheel bracket and the counter-piece, the annular peripheral bottom portion of the vat and the depending foot rim thereof assume the sprung suspension of the wheel.

For a full understanding of the present invention, reference should now be made to the following detailed description of the preferred embodiments of the invention as illustrated in the accompanying drawings.

BRIEF DESCRIPTION OF THE DRAWINGS

FIG. 3 is an exploded perspective view from below of the wheel bracket and the wheel of FIGS. 1 and 2.

DESCRIPTION OF THE PREFERRED EMBODIMENTS

Figure 1:
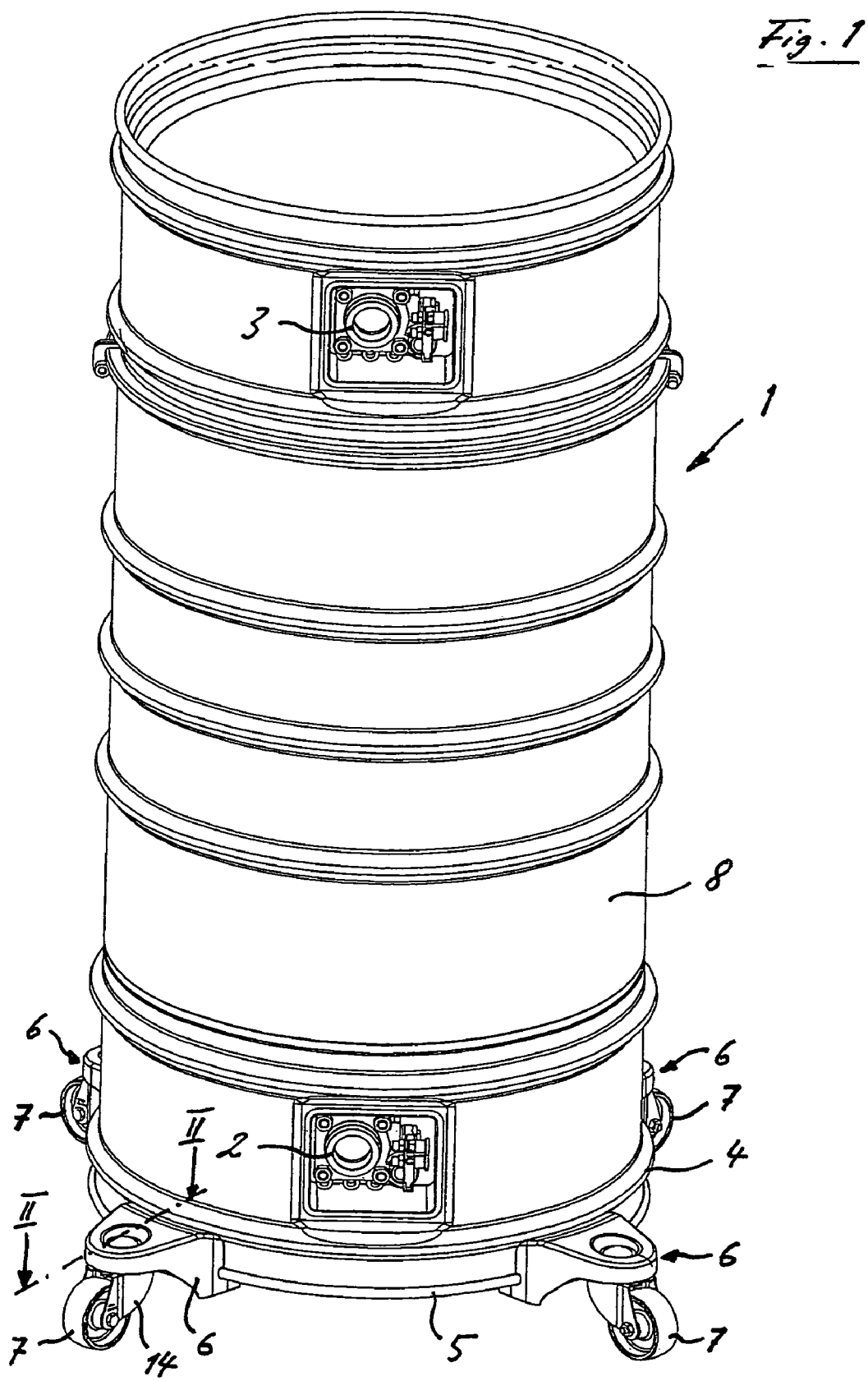
FIG. 1 is a perspective view of a sorption column having a wheelbracket and a wheel.

The preferred embodiments of the present invention will now be described with reference to FIGS. 1-3 of the drawings. Identical elements in the various figures are designated with the same reference numerals.

As shown in FIG. 1, a cylindrical vat 1 has a plurality of peripheral corrugations such as corrugation 4 in the bottom end area above depending foot rim 5, which constitutes the lower termination of vat 1. In the area of foot rim 5 are secured four wheel brackets 6 mounting one wheel 7 each. The four wheel brackets 6 are spaced 90° along the periphery of vat 1 and secured thereto. Alternatively, three such wheel brackets 6—spaced 120°—or more than four may be secured to vat 1.

Figure 2:
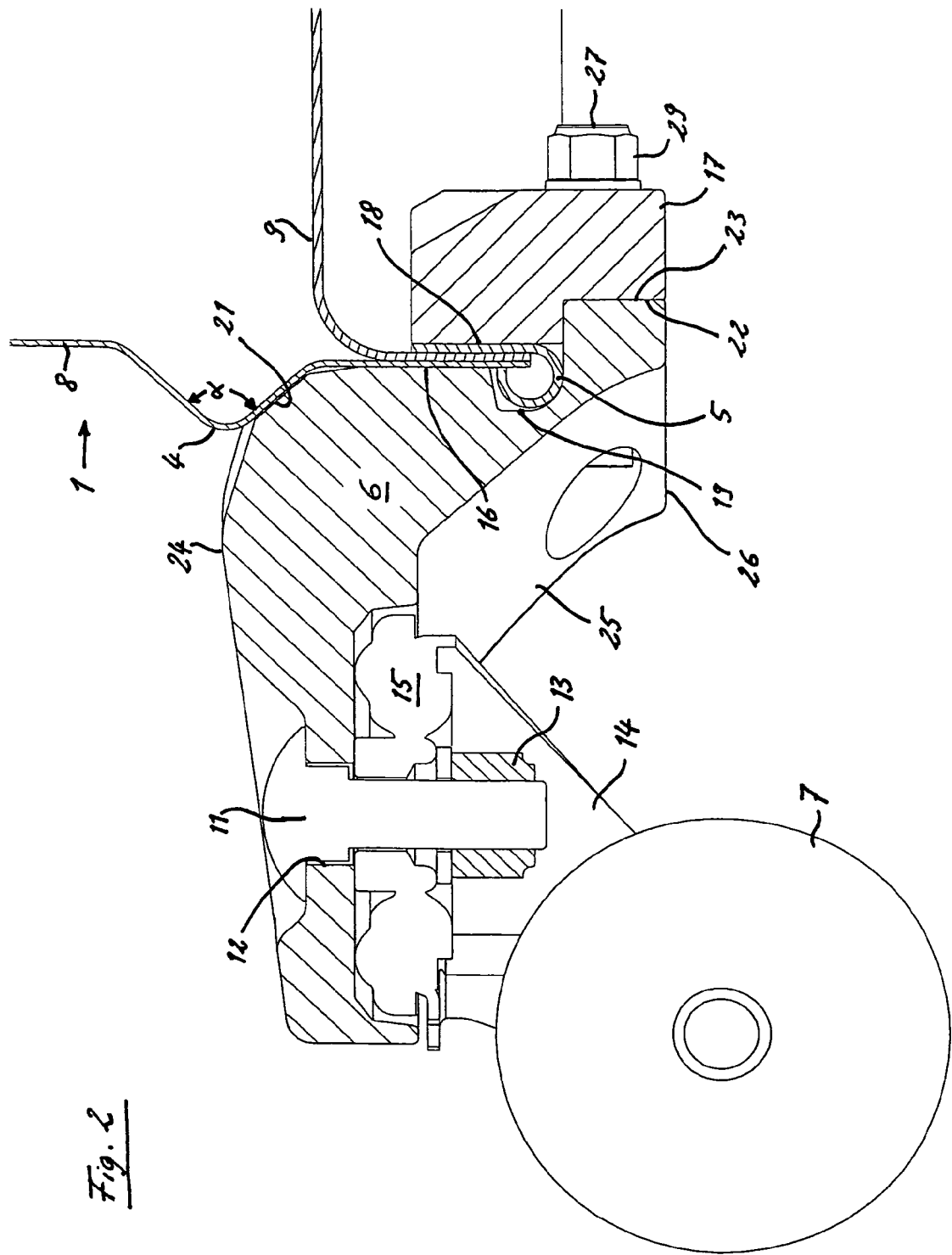
FIG. 2 shows a section through the wheel bracket and its wheel along lines II-II in FIG. 1.

As shown especially in FIG. 2, depending foot rim 5 terminates and borders the bottom edge of outside wall 8 of vat 1, to which bottom panel 9 is secured. The outwardly protruding bottom corrugation 4 has two side walls or legs which include an angle α of approximately 90° so that the sidewalls of corrugation 4 include an angle of approximately 45° with the longitudinal axis of vat 1.

Wheel 7 is mounted on wheel bracket 6 for 360° pivoting movement about a vertical axis. To this end, a vertical threaded bolt 11 is provided to extend through a bore 12 in wheel bracket 6 and secured by means of a nut 13 to wheel mount 14 which supports wheel 7. An anti-friction bearing (not shown) is provided in the space 15 between wheel mount 14 and wheel bracket 6.

Wheel bracket 6 has an engagement surface 16 by which it engages the outside surface 8 of vat 1 in full-surface contact between foot rim 5 and corrugation 4. To this end, engagement 16 is curved in accordance with the radius of outside surface 8.

For clamping the engagement surface 16 of wheel console 6 in place against outside wall 8, it is threadingly coupled to a mating or complementary counter-piece 17 engaging the inside surface of foot rim 5. For full-surface contact of engagement surface 18 of counter-piece 17 with foot rim 5, the former is curved to have the same radius as the inside surface of the latter.

Below its engagement surface 16, wheel bracket 6 has therein an annular groove 19 for the reception of a bead on foot rim 5; in its upper area, it has an inclined curved portion 21 for full-surface contact on the underside—i.e. the lower side wall—of corrugation 4.

Wheel bracket 6 and counter-piece 17 each comprise a casting of an aluminum alloy.

Below annular groove 19, wheel bracket 6 has on its side facing counter-piece 17 a planar surface 22 engaging a plane-parallel planar surface 23 below engagement surface 18 of counter-piece 17. The mutually facing plane-parallel planar surfaces 22, 23 constitute mating surfaces and, to this end, are slightly undersized relative to the distance between engagement surfaces 16, 18 of wheel bracket 6 and counter-piece 17, respectively.

The top surface of wheel bracket 6 is upwardly curved or domed between the vertical pivoting axis of wheel mount 14, i.e. bolt 11, and the inclined section 21 engaging corrugation 4.

To permit wheel 7 to be pivoted through 360° under wheel bracket 6, the latter has a spherical recess 25 on its underside. As shown particularly in FIG. 3, this results in an arcuate edge 26 on the underside of wheel bracket 6. Thus, the thickness of wheel bracket 6 is smaller at the centre of the arcuate wedge 26 and greater at the two end portions. For this reason, the threaded coupling of counter-piece 17 to wheel bracket 6 is effected by means of two threaded bolts 27, 28 which extend through wheel bracket 6 in the thicker end portions thereof.

Heads 31, 32 of threaded bolts 27, 28 engage wheel bracket 6 and may be formed each to have a polygonal socket therein. Nuts 29, 30 are threaded on the ends of threaded bolts 27, 28 which protrude from counter-piece 17.

There has thus been shown and described a novel wheeled chassis assembly for vats, especially for sorption columns, which fulfills all the objects and advantages sought therefore. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A wheeled chassis assembly for a vat having at the bottom end thereof a depending foot rim and an annular corrugation above said rim, said assembly comprising:
   (a) a plurality of wheel brackets, each having a wheel secured to a wheel mount provided on the wheel bracket for pivoting movement about a vertical axes, with each wheel bracket (1) having an engagement surface pressed against the foot rim and the corrugation on an outside surface of the vat and (2) having formed therein below its engagement surface an annular groove for the reception of foot rim, and
   (b) a counter-piece disposed, on an inside surface of the vat, opposite each wheel bracket for pressing the engagement surface against the outside surface of the vat;
   wherein the corrugation projects outwardly from the bottom end of the vat above foot rim; wherein the engagement surface of the wheel bracket is formed with an inclined curved portion for engaging the corrugation and to conform with the configuration thereof; wherein the counter-piece is threadingly coupled to the wheel bracket; wherein the engagement surface of the wheel bracket is curved to conform with outside surface of vat;

and wherein the engagement surface of the counter-piece is curved to conform with the inside surface of foot rim.

2. Wheeled chassis assembly in as in claim 1, wherein at least one of the wheel bracket and the counter-piece are made of a casting.

3. Wheeled chassis assembly as in claim 1, wherein at least one of the wheel bracket and the counter-piece are made of a light-weight metal.

4. Wheeled chassis assembly as in claim 1, comprising mutually facing plane-parallel planar mating surfaces on wheel bracket below annular groove and on counter-piece, respectively, below engagement surface on the inside surface of foot rim.

5. Wheeled chassis assembly in as in claim 1, comprising an upward curvature in the top surface of wheel bracket between the vertical pivoting axis of wheel support and the inclined portion engaging the corrugation.

6. Wheeled chassis assembly in as in claim 1, wherein the wheel bracket has at the underside thereof a spherical recess permitting wheel to be pivoted full circle.

7. Wheeled chassis assembly as in claim 1, further comprising a pair of threaded bolts for threadingly coupling the counter-piece to the wheel bracket, said bolts circumferentially engaging the end portions of the wheel bracket and of the counter-piece.

* * * * *